Aug. 22, 1967  A. NELKIN  3,337,839
VETRASONIC GUIDANCE APPARATUS
Filed April 27, 1966  2 Sheets-Sheet 1
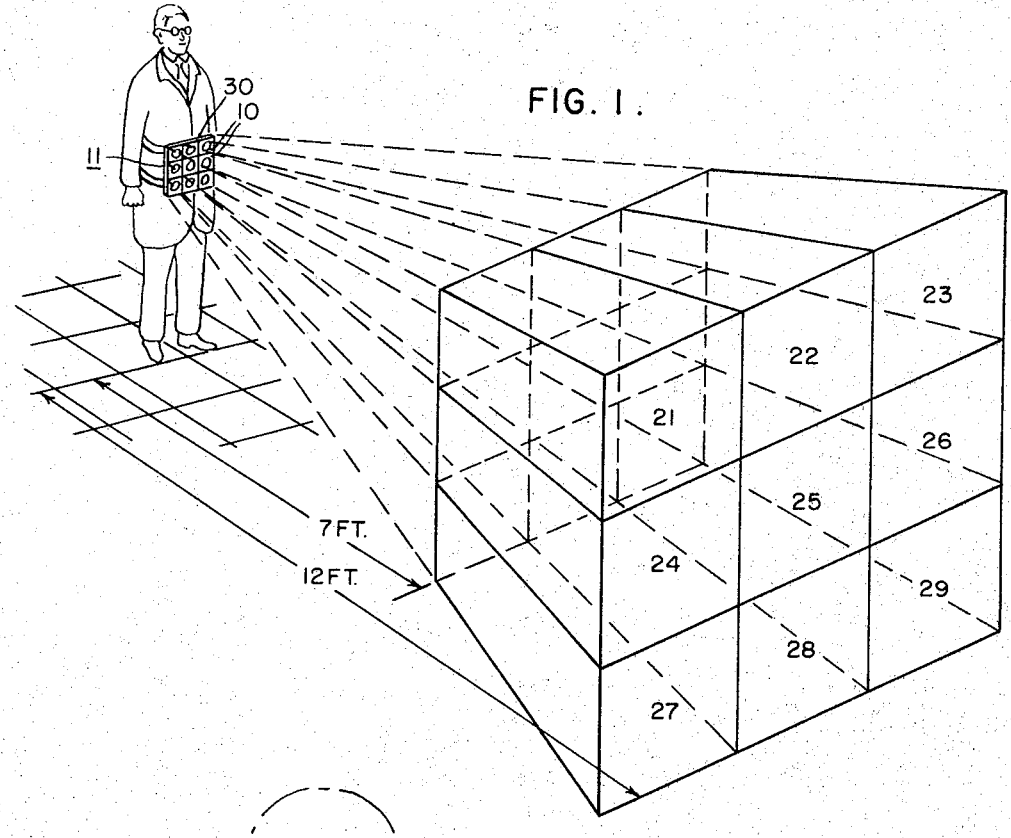
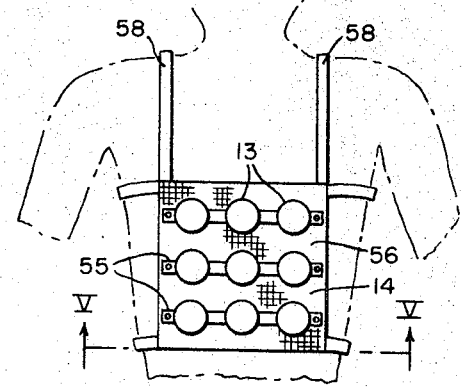
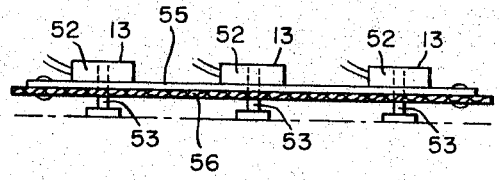
WITNESSES
Robert C. Baird
Leon M. Garman
INVENTOR
Arthur Nelkin.
BY
W. J. Straitiff
AGENT

United States Patent Office 3,337,839
Patented Aug. 22, 1967

3,337,839
ULTRASONIC GUIDANCE APPARATUS
Arthur Nelkin, Pittsburgh, Pa., assignor to Westinghouse Electric Corporation, Pittsburgh, Pa., a corporation of Pennsylvania
Filed Apr. 27, 1966, Ser. No. 545,637
8 Claims. (Cl. 340—1)

The present invention relates to guidance apparatus, and more particularly to such apparatus employing ultrasound to scan an area for detection and location of obstacles in a direction of interest.

It is a principal object of the present invention to provide a guidance apparatus for a person deprived of sight, which would be particularly useful to blind persons and/or others whose vision may be obscured by such as darkness, fog, etc.

In general, the guidance apparatus of the present invention comprises electrically-operated means, including an array of ultrasonic transducers, operable to scan a region of space in a particular generally-horizontal direction for object presence-and-location detection by transmission of a plurality of ultrasound beams through respective adjacent portions of such region and respective sensing of ultrasound echo returns within the paths of such beams resultant from reflection by objects within a prescribed range of distances from the transducers; and an array of tactile-stimulus producers for disposition over an area of the user's body, which tactile stimulus producers are actuated by the electrically-operated means respectively in response to the ultrasound echo returns within the beam domains and are so arranged and spaced as to afford tactual differentiation between the tactile signals from the several such producers for recognition of a sensory pattern corresponding to location of objects in the scanned region.

Other objects, features, and advantages of the invention will become obvious from the following detailed description thereof when taken in connection with the accompanying drawing, in which:

FIGURE 1 is a perspective view of a pedestrian employing the guidance apparatus of the present invention, with the zones being scanned by ultrasonic vibrations being indicated schematically in dash outline;

FIG. 4 is a rear view of a person having an array of tactile-stimulus producers disposed across an area of his back, in accord with an illustrative embodiment of the present invention; and FIG. 5 is a horizontal sectional view taken along the line 5—5 in FIG. 4 showing details of a row of stimulus producers employed in triplicate in the array shown in FIG. 4.

Figure 3:
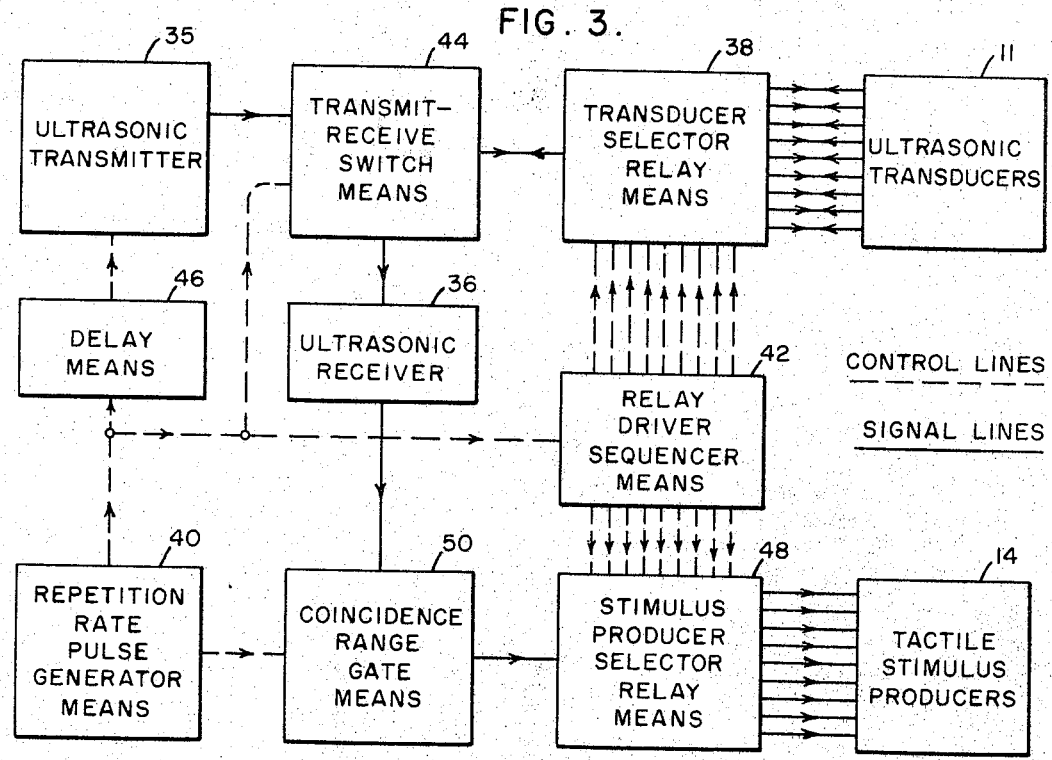
FIG. 3 is a block diagram of the components of an illustrative embodiment of the present invention.

The apparatus of the present invention employs ultrasonic vibration energy, ultrasound, for object detection and location as a mobility aid for a person deprived of vision. It automatically scans a volume or region of space ahead of the user by use of an array of transducers, each observing a specific conical volume, beam, respective thereto, and presents echo-return information indicative of the presence of an object in one or more of the beams to the user tactually via an array of tactile-stimulus producers coupled to a skin area of the user's body.

For example, in the illustrative embodiment shown in FIG. 1, nine ultrasonic transducers 10 in a square three-by-three array 11 are disposed in front of the user and facing in a generally forward horizontal direction. The tactile-stimulus producers 13, equal in number to the ultrasonic transducers, are mounted on the user's body, such as across his back as shown in FIG. 4, in an array 14 positioned identically to the transducer array 11 so that the spatial positioning of the ultrasonic transducers 10 and the tactile-stimulus producers 13 will be the same. Thus, if a particular ultrasonic transducer 10 receives an echo from an obstacle in the volume respective to its beam, it will in turn feed the signal to the corresponding tactile-stimulus producer 13 and the operator will know that an obstacle exists in the volume of space within the beam of that particular transducer.

The illustrative embodiment shown and described herein corresponds to an experimental unit which operates in the 80 kilocycle frequency region and automatically scans nine conical volumes, numbered 21 to 29 in FIG. 1, ahead of the transducer array 11. The nine ultrasonic transducers 10 each have a nine-degree beam width and are used both for transmitting and receiving. Each transducer 10 transmits a two-millisecond 80-kilocycle ultrasound pulse and the apparatus is gated so that it responds to echo return at such pulse within a volume five feet in depth. Hence, the space-volume ahead of the operator or user was scanned by nine truncated conical beams five feet in depth.

Figure 2:
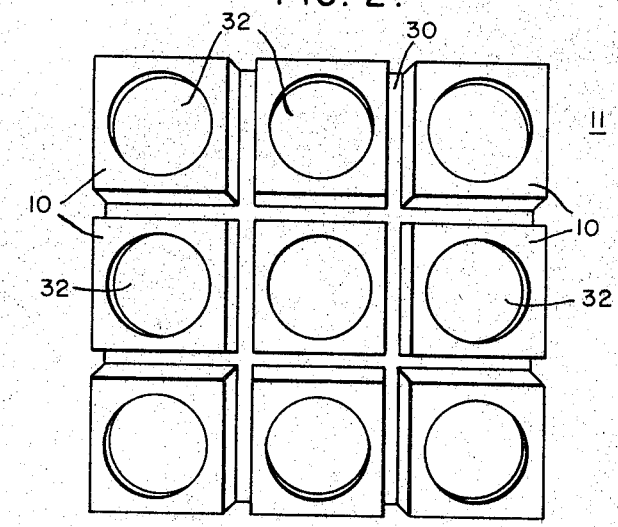
FIG. 2 is a front view of an array of electrostatic type ultrasonic transducers employed in an illustrative embodiment of the present invention.

If, for example, a return signal or ultrasound echo is received from sectors 21, 22 or 23 shown in FIG. 1, the three corresponding tactile-signal producers 13 will operate to signify to the operator that there is an obstruction extending horizontally at about head height which he will have to avoid by swerving or bending down, presuming that he is on foot. If the echo signal is received in sectors 21, 24 and 27, the user will be apprised by the corresponding tactile-signal producers that an obstacle exists which extends vertically and to the right of his direction of transducer array aiming and hence he will have to veer to his left, etc. In the experimental embodiment as illustrated herein, each of the array of nine transducers 10 was of the non-resonant electrostatic type attached to a common mounting plate 30, as shown in FIGS. 1 and 2. The center transducer, when the array is suitably orientated, points in the direction of travel of the user. The two transducers at opposite sides of the center transducer are suitably tilted from the axis of such center transducer. By virtue of the frequently employed in operation of the transducers and of the diameter of the radiating diaphragm 32 the transducers were made to have a narrow beam in the order of nine degrees, so that the two transducers at opposite sides of the center transducer covered an angle from 6.5 degrees to 15.5 degrees to the right and left of the axis of the center transducer. The same is true of the transducers above and below the center transducers, i.e., they covered an angle from 6.5 degrees to 15.5 degrees above and below the axis of the center transducer. The corner transducers also were tilted from the axis of the center transducer.

In accord with a feature of the illustrative embodiment, the apparatus is constructed to provide several ranges which may be selected by the operator or user. In the experimental embodiment three manually-selectable ranges were provided. The closest range was chosen to be from 2.5 feet to 7.5 feet, a medium range was chosen to be from 4.5 feet to 9.5 feet, and a long range was chosen to be from 7 feet to 12 feet. At about 7 feet from the operator or user the transducer beams cover roughly an outline of 4 feet high by 4 feet wide, as indicated schematically in FIG. 1. With a user carrying such transducer array while on foot at a level of about three and one-half feet above the ground, for example, the lower edge of the rectangular sensitivity area or observance area can be oriented to intersect the floor or surface on which such user is walking at a distance within the selected observance range.

In the illustrative embodiment, a single transmitter 35 and a single receiver 36 are used in the apparatus, FIG. 3. These are switched or commutated in sequence from one transducer 10 to another. A transducer selector relay means 38 switches to a first position, for example, connecting the transmitter 35 to the transducer 10 corresponding to zone 21 in FIG. 1, for example. For the first 4.6 milliseconds after the transducer is energized by the 80 kc. signal from the transmitter 35 the ultrasound pulse transmitted by such transducer is propagated through its respective beam in the direction of zone 21. During that time the receiver 36 remains ineffective to call for any echo-return-response indication, thus any echo returns from within the first 2½ feet away from the transducer are ignored, or gated out, to reduce side lobe problems. The receiver is then opened for 9.1 milliseconds while the transducer operates in its listening mode, permitting response to any ultrasound echo return within the respective beam from obstacles 2.5 to 7.5 feet away. Fourteen milliseconds after the initial pulse of ultrasonic vibration, the selector relay means 38 switches to the next transducer 10, such as that covering zone 22 in FIG. 1. This continues from transducer 10 to transducer 10 until the transducer selector relay means 38 has connected the transmitter and receiver alternately to all nine transducers and then it repeats. A complete scan involving all nine of the transducers 10 takes 126 milliseconds. Hence, in the short range operation of the experimental embodiment of the apparatus referred to, such apparatus looks at each sector of the observed volume approximately eight times a second. For the long range, the receiver gate remains closed for the first 17.2 milliseconds and then open for 9.1 milliseconds. This permits the receiver to receive ultrasound echoes from 7 to 12 feet in front of the transducer array. Twenty-seven milliseconds after the transmitted pulse, the selector relay means switches to a subsequent transducer, etc. A complete scan requires 243 milliseconds, hence the user will get roughly four looks per second. The intermediate range provides roughly six looks per second.

The block diagram in FIG. 3 illustrates the basic components of the experimental embodiment of the invention. A repetition rate pulse generator means 40 provides the triggering signals for the switching circuitry. The pulses from the repetition rate generator means 40: triggers a relay driver sequencer means 42 to sequentially operate the transducer relays comprised in the transducer selector relay means 38; control alternating operation of a transmit-receive switch means 44; control on-off operation of the transmitter 35 by way of a delay means 46; and trigger operation of a stimulus producer selector relay means 48 by way of a coincidence range gate means 50. Initially the transmit-receive switch means 44 remains in the transmit position keeping the receiver closed off, permitting the apparatus to gate out the first few feet. The second trigger pulse then switches the transmit-receive switch means 44 to the receive position and the receiver 36 remains open for 9.1 milliseconds permitting an echo signal to pass from the particular transducer through to the receiver 36 and thence to the corresponding tactile stimulus producer through the stimulus producer selector relay means 48 for the duration called for by the coincidence range gate means. The next trigger pulse operates the relay driver sequencer means 42 to switch to the next transducer. The remainder of the circuitry operates as previously mentioned and the sequence continues through the nine positions and repeats on the tenth series of signals. Selection of the several different ranges is done by switch means (not shown) affiliated with the repetition rate pulse generator means 40 to change the pulse rate according to the several ranges which may be selected.

In the illustrative embodiment of the invention of which a certain amount of experimental use has been obtained, each of the tactile stimulus producers has taken the form of a solenoid, FIG. 5, comprising a coil 52 for actuating an armature 53 against the local surface of the user's skin, such as on his back, FIG. 4, in such experimental embodiments as illustrated herein. The stimulus producers 13 correspond in number to the ultrasonic transducers 10 and are arranged in similar array so that when an echo is received from the nine different zones in FIG. 1, a corresponding stimulus is produced in a particular area of the user's body corresponding in such zones. In the arrangement shown in FIG. 4 the stimulus producers 13 are physically mounted in groups of three with a common strip-like member 55 which in turn is mounted on a flexible fabric member 56 and carrier by the user to afford a degree of conformance to the shape of the skin surface with which the array is affiliated. Shoulder straps 58 have been employed to enable the user to wear such array and the bottom is secured in place by tie strings (not shown).

Various modifications may be made within the spirit of the invention. These may include, for example, a different operating frequency; different angle beamwidths; different angle of beams with respect to line of advance; different numbers of beams; different ranges and range gates; different types of tactile stimulus producers and at different locations on the user's body; and different types of ultrasound transducers, a piezoceramic type rather than the exemplified electrostatic type, for example.

I claim as my invention:

1. Guidance apparatus for a person deprived of sight, comprising electrically-operated means, including an array of ultrasonic transducers, operable to scan a region of space in a particular generally horizontal direction for object presence and location detection by transmission of a plurality of ultrasound beams through respective adjacent portions of such region and respective sensing of ultrasound echo returns within the domains of such beams resultant from reflection by objects within a prescribed range of distances from said transducers; and an array of tactile-stimulus producers for disposition over areas of the user's body, said tactile-stimulus producers being actuated by said electrically-operated means respectively in response to said ultrasound echo returns and so arranged and spaced as to afford tactual differentiation between the tactile signals from the several such producers for recognition of a tactual sensory pattern corresponding to location of objects in the scanned region.

2. The apparatus of claim 1, wherein each of the several tactile-stimulus producers is in the form of a solenoid having a winding and an armature to exert a force against the user's skin.

3. The apparatus of claim 1, wherein the array of ultrasonic transducers is rectangular and includes at least four mutually-angulated ultrasonic transducers arranged in vertical and horizontal relationship to give a corresponding number of vertical and horizontal object-sensing locations, and wherein there is an equal number of tactile-stimulus producers in a similar array respectively responsive to such transducers.

4. The apparatus of claim 1, wherein the array of tactile-stimulus producers is constructed to be disposed on the user's back with such producers distributed over an area thereof.

5. The apparatus of claim 1, wherein the electrically-operated means also comprises transmitter means for generating an alternating current signal at ultrasonic frequency for driving the transducers in a transmitting mode of their operation; receiver means for deriving an operative signal for the tactile-stimulus producers responsively to output from the ultrasonic transducers in a receiving mode of their operation; range gate means to limit the time that the stimulus producers will respond to an output signal from the receiver means; transmit-receive switch means for alternating connection of the transducers from the transmitter means to the receiver means; transducer-selector relay means operable to establish selective connection of the transducers to the transmit-receive switch means; stimulus-producer selector relay means operable to establish selective connection of the stimulus producers to the receiver means; relay driver sequencer means for effecting simultaneous sequential operation of the transducer selector and stimulus producer selector relay means; and repetition rate pulse generator means controlling operation of the transmit-receive switch means, the transmitter means, the relay driver sequence means, and the range gate means, whereby the transducers will transmit and receive sequentially during respective pulse repetition periods in their respective directions of aiming and each given the opportunity to effect operation of their respective tactile stimulus producers during the interval of time determined by the duration of each pulse repetition period and the range gate means.

6. The apparatus of claim 1, wherein the electrically-operated means is adjustable to vary the effective range of response to ultrasound echo returns.

7. The apparatus of claim 1, wherein the array of ultrasonic transducers includes certain downwardly angulated transducers for sensing the location of the surface along which the user desires to progress, and the electrically-operated means is adjustable to so vary the effective range of response as to enable operation of the stimulus producers corresponding to such certain transducers as a reference point with respect to operation of the other stimulus producers.

8. The apparatus of claim 1, wherein the transmitter operating frequency is about eighty kilocycles, the ultrasonic transducers are of the non-resonant electrostatic type having about a ten degree conical beam in a square three-by-three array with the center one intended to point horizontally in the direction of travel of the user and each of the others tilted relative to the axis of such center one, and the electrically-operated means provides for sensing the presence of objects within a depth of about five feet at selective distances away of from about two or seven feet, with the number of observances per second taken by each transducer varying from about four to eight, according to selection of the aforesaid selective distances.

References Cited

UNITED STATES PATENTS 2,574,596   11/1951   Slaymaker _____ 340—16

RODNEY D. BENNETT, *Primary Examiner.*

R. A. FARLEY, *Assistant Examiner.*